UNITED STATES PATENT OFFICE.

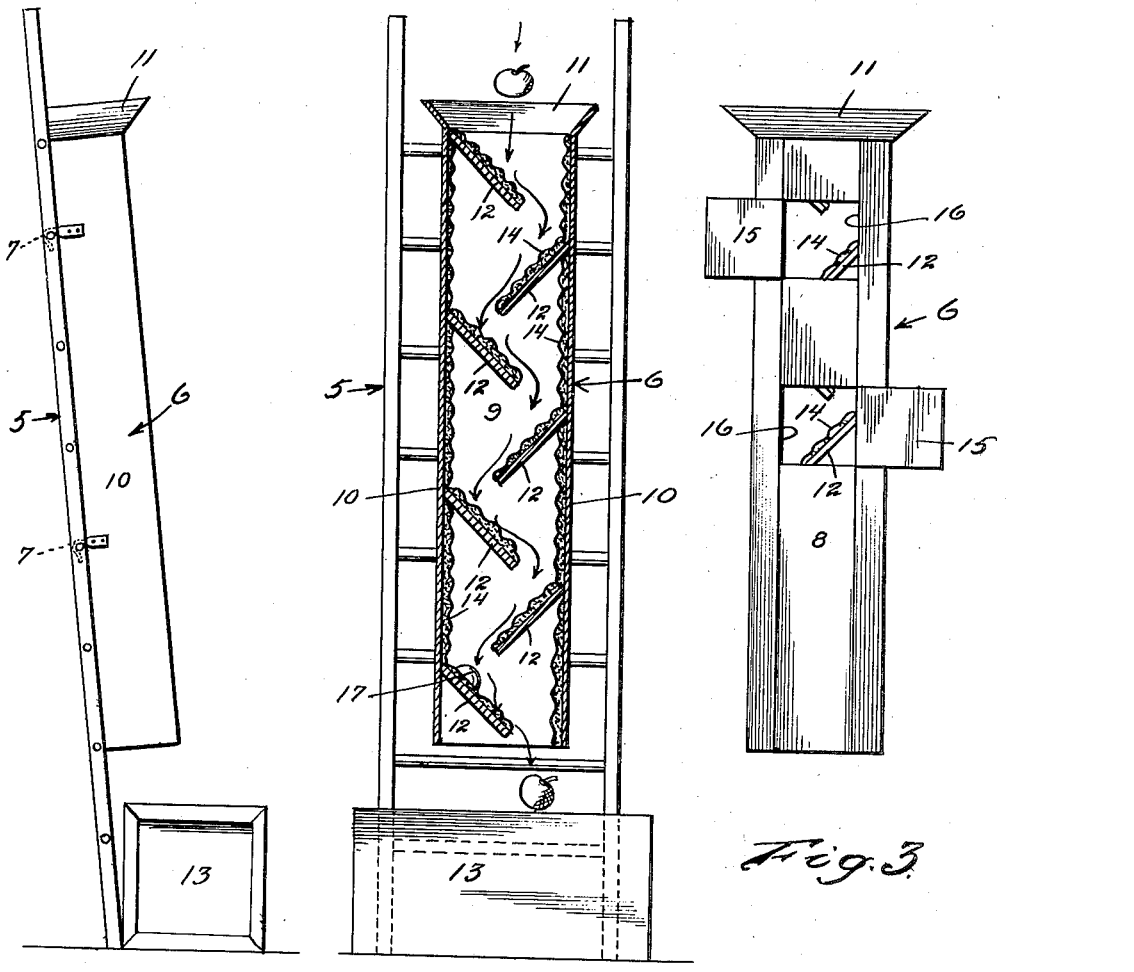

OSCAR C. GRAMLING, OF MADISON, FLORIDA.

FRUIT-PICKER CONVEYER.

1,133,436.  Specification of Letters Patent.  Patented Mar. 30, 1915.

Application filed July 7, 1914. Serial No. 849,590.

*To all whom it may concern:*

Be it known that I, OSCAR C. GRAMLING, a citizen of the United States, residing at Madison, in the county of Madison, State of Florida, have invented certain new and useful Improvements in Fruit-Picker Conveyers; and I do hereby declare the following to be a full, clear, and exact description of the invention, such as will enable others skilled in the art to which it appertains to make and use the same.

This invention relates to harvesting devices, particularly to a harvesting device for the use of horticulturalists and others in the harvesting of fruit, and has for its object the provision of a novel fruit conveyer adapted to be attached to an ordinary ladder and adapted to convey picked fruit from the tree to the ground.

An important object is the provision of a device of this character which is so constructed as to prevent bruising of the fruit during its travel to the ground.

Another important object is the provision of a device of this character equipped with a signal bell whereby the operator can tell whether the fruit is passing properly through the device or whether it has become jammed on the way, and also whereby an overseer at a central station may be able to tell whether or not the fruit pickers are working or not.

An additional object is the provision of a device of this character provided with a plurality of fruit entrance openings whereby the device may be used conveniently when picking either high or low growing fruit.

A further object is the provision of a device of this character which will be simple and inexpensive in manufacture, efficient and durable in service and a general improvement of the art.

With these and other objects and advantages in view, my invention consists in the novel construction and arrangement of parts to be hereinafter more fully described and claimed, and illustrated in the accompanying drawing, in which, Figure 1 is a side elevation of my device applied to a ladder. Fig. 2 is a longitudinal section through the conveyer, the ladder to which it is attached and the receptacle in which the fruit is finally received being shown in elevation, as also are two examples of fruit. Fig. 3 is an elevation of the conveyer detached from the ladder, and showing two of the fruit receiving openings, with their doors flung outwardly to permit of insertion of fruit at different points of the height of the device. Fig. 4 is a transverse section through the conveyer, and the ladder to which it is attached, the section being taken in a plane slightly above the bell hereinafter described, the fruit box in which the fruit is finally received, being omitted.

Referring more particularly to the drawing, the numeral 5 designates an ordinary ladder to which my device, designated as a whole by the numeral 6, is adapted to be secured by hooks 7 engaging the rungs of the ladder or by any other suitable means.

My device comprises front, back, and side walls 8, 9 and 10 respectively, forming a closure having its top and bottom ends open. The upper ends of the walls are flared outwardly as shown at 11 to form a receiving hopper.

Disposed within the casing formed by the walls described, are inclined plates 12 which serve to check the speed of fruit deposited within the casing so that fruit will pass through the casing and be gently deposited within a suitable fruit box 13 disposed beneath the device upon the ground. In order that the fruit will not be bruised during its passage through the casing, I provide the inclined plates 12 and the inner faces of the walls of the casing with padding 14 of any suitable kind and secured in any suitable manner.

When the device is used when high growing fruit is picked, the fruit will be deposited into the top of the casing, whereupon it will pass from one inclined plate 12 to another and down into the box 13. When it is desired to pick low growing fruit, the operator may open any one of a plurality of doors 15 which may be mounted in any suitable manner and adapted to close openings 16 in the wall, and deposit the fruit within any desired one of the openings 16.

In order that the operator may know that the device is working properly, and that the fruit is not jammed therein, I provide a bell 17 secured upon the lowermost inclined plate 12 in a position to be struck by fruit dropping from the inclined plate next above it. When the bell is ringing, then the operator knows that the fruit is not jammed within the casing. Another feature is that in case several operators are working in an orchard the overseer will know by the ringing of the bells whether the operators are busy or idle and can therefore watch them properly.

It will be readily understood that I reserve the right to make various changes in the form, construction and arrangement of parts without departing from the spirit of the invention or limiting the scope of the subjoined claims.

Having thus described my invention, I claim:

1. In combination with a ladder, a casing open at its top and bottom, a plurality of inclined check plates within said casing, the interior of said casing and the tops of said plates being padded, and a bell disposed upon one inclined plate and adapted to be struck by fruit passing from the preceding plate.

2. In combination with a ladder, a fruit conveyer comprising a casing open at its top and bottom and provided with openings in its front wall, doors for closing said openings in said wall, a plurality of inclined plates within said casing, said plates and the interior of said casing being padded, and an audible signal within said casing and operated by the passage of fruit.

In testimony whereof I affix my signature, in the presence of two witnesses.

OSCAR C. GRAMLING.

Witnesses:
 HOWELL L. YATES,
 GEO. L. MORROW.